United States Patent [19]
Hsiao et al.

[11] 3,852,050
[45] Dec. 3, 1974

[54] PROCESS FOR RECOVERING PHOSPHORUS

[75] Inventors: Chao Hsiao; Lawrence B. Horton, both of Pocatello, Idaho

[73] Assignee: FMC Corporation, New York, N.Y.

[22] Filed: Nov. 15, 1972

[21] Appl. No.: 306,767

[52] U.S. Cl. .................................. 55/73, 55/94
[51] Int. Cl. .............................. B01d 53/14
[58] Field of Search ........... 55/73, 93, 94, 228, 229

[56] References Cited
UNITED STATES PATENTS 2,050,797  8/1936  Kenschbaum et al. ............... 55/228
3,148,042  9/1964  Hannisch et al. ..................... 55/73

Primary Examiner—Charles N. Hart

[57] ABSTRACT

A gas stream containing gaseous phosphorus is treated to recover the phosphorus in a plurality of condensing stages by initially cooling the gas stream in a primary condenser stage with water to condense liquid phosphorus, passing the gas stream containing uncondensed phosphorus to a second condenser, condensing light, fluffy particles of phosphorus containing water (snowflake) in the secondary condenser, passing the snowflake particles to a settling zone containing liquid phosphorus from the primary condenser, and recovering liquid phosphorus from the settling zone.

4 Claims, 1 Drawing Figure

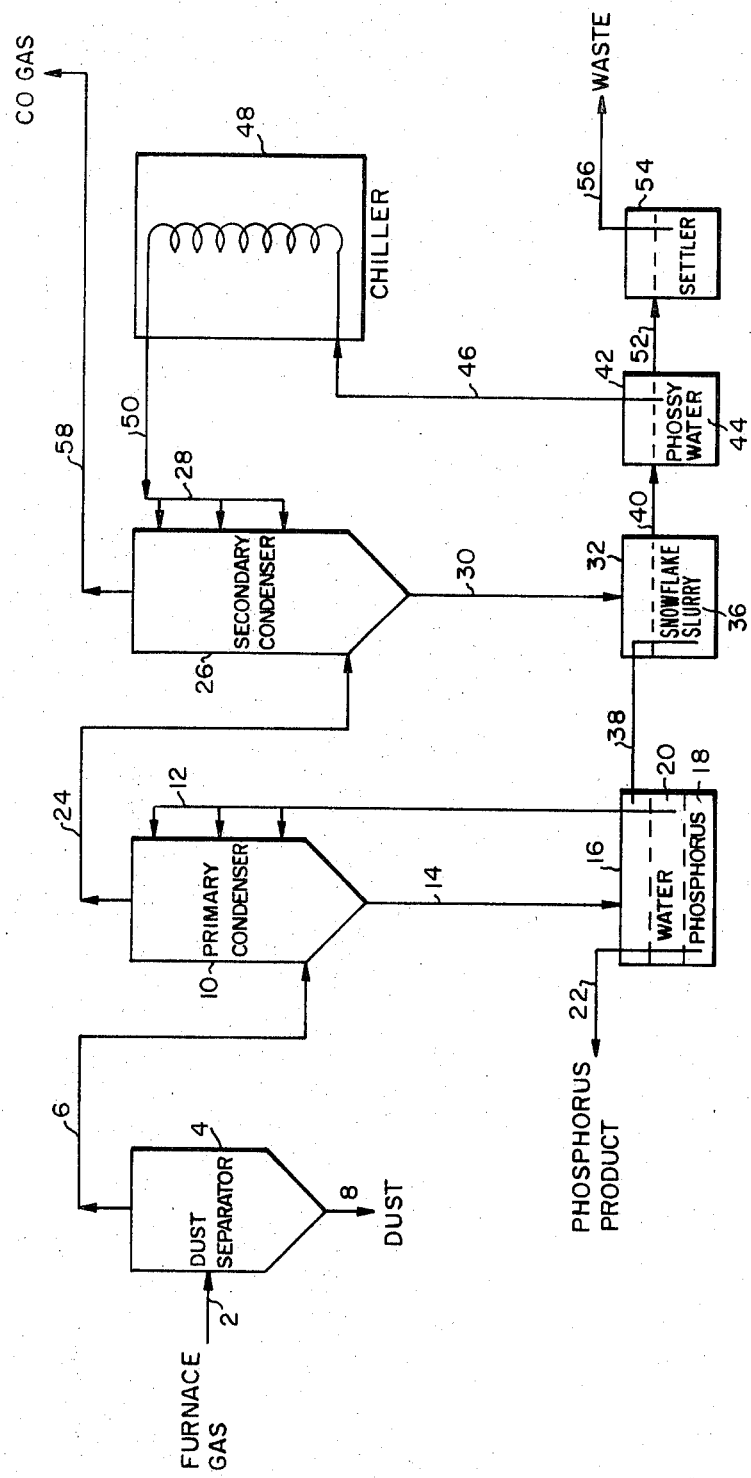

PROCESS FOR RECOVERING PHOSPHORUS

This invention relates to the recovery of elemental phosphorus from a gas stream containing same, and more particularly, a gas stream from an electric reduction furnace containing phosphorus, carbon monoxide and water.

In the process of producing phosphorus by the well-known electric furnace reduction method, a phosphorus ore is reduced in an electric furnace to yield a gas stream containing elemental phosphorus, carbon monoxide and some water. The resulting gas stream is treated to recover phosphorus by condensing the phosphorus in one or more condensers. This is carried out by passing cold water in contact with the gas stream and condensing phosphorus from the stream. The remaining gas stream exits from the condenser while the condensed phosphorus is recovered as a liquid and passed with water to a liquid settler for recovery.

In the above process the use of a single condensing stage is not entirely satisfactory because some phosphorus is not condensed in the condenser and escapes in the exit gas stream. While more phosphorus could be recovered in the condenser by lowering the condensing temperature, the large amount of phosphorus condensed must be in a liquid state for satisfactory operation. Since phosphorus freezes at temperatures of 44°C and below, the condenser cannot be operated at or below 44°C. Further, since the recovered phosphorus must remain in a liquid state throughout the condensing system, a temperature substantially above 44°C must be used to assure that no localized freezing occurs.

To overcome this difficulty a secondary condenser, such as described in U.S. Pat. No. 3,148,042 issued Sept. 8, 1964, has been proposed. The specially designed secondary condenser of said patent is employed after an initial condensing stage and additional phosphorus is recovered from the gas stream as a solid. The solidified elemental phosphorus collects with water in a chamber and is recovered by melting the solidified phosphorus from the secondary condenser and passing the molten phosphorus to a recovery zone. The collecting chamber is either part of the condensing system or the base of the secondary condenser. The period required for heating and melting the phosphorus may be several hours. During this heating period the secondary condenser cannot be operated. As a result, recovery of phosphorus from the secondary condenser must be periodic and operation of the condenser during the periodic melting and recovery of the phosphorus is not possible.

While the above described secondary condensing apparatus aids in recovering additional phosphorus from the gas stream, it suffers the problem of requiring regular shutdowns in operation in order to recover the condensed, solid phosphorus. As a result, this system is not desirable in a plant where a continuous operation must be carried out. In addition, the melting of the phosphorus in the secondary condenser requires additional steam lines and heaters, specialized equipment, non-productive down time, and this is economically unattractive.

As a result, there is a need for a process which increases phosphorus recovery from a gas stream on a continuous basis, without special equipment required to melt precipitated, solid phosphorus and without the time delay required for carrying out such melting.

It has now been found that phosphorus can be recovered from a gas stream containing vaporous phosphorus by contacting the gas stream in an initial condensing zone with water at a temperature sufficient to condense a portion of the gaseous phosphorus in said gas stream to liquid phosphorus, passing the liquid phosphorus into a settling zone, passing the exit gas stream from the initial condensing zone containing residual, uncondensed phosphorus into a secondary condensing zone, contacting said exit gas stream with chilled water at a temperature sufficiently low to condense light, fluffy particles of solid phosphorus containing water therein (snowflake), passing said particles to said settling zone containing liquid phosphorus and recovering liquid phosphorus from said first holding zone.

In carrying out the present invention a gas stream from an electric reduction furnace, which contains essentially carbon monoxide, elemental phosphorus, water and dust particles, is treated to remove all dust and solids from the stream. This can be achieved in conventional cyclones or other equipment used to separate solids from gas streams. The solids-free gas stream, which is at a temperature of about 400°C, is then passed into the base of a primary condenser. Water is sprayed into the primary condenser counter-current to the gas stream. The water cools the gas stream primarily by evaporation and condenses liquid phosphorus from the gas stream. The water which enters the primary condenser is maintained at a temperature sufficient to cool the gas stream so that the exit gases from the condenser are at a temperature of around 60°C. During this stage it is essential that the temperature of the water not cool the phosphorus in the primary condenser to 44°C or below, at which temperatures phosphorus solidifies. The water and condensed liquid phosphorus are then passed into a settling tank where the liquid phosphorus is maintained above its solidification point by heating means. The phosphorus settles to the base of the tank and the water remains as a supernatant layer. The liquid phosphorus can then be removed for recovery as desired.

During the passage of the gas stream through the primary condenser at least 90 percent of the phosphorus in the gas stream is removed and condensed. The exiting gas stream from the primary condenser is then passed into the base of a secondary condenser. This gas stream, which must be above 44°C and preferably is at a temperature of about 60°C, is saturated with phosphorus at the exiting temperature.

In the secondary condenser, chilled water is sprayed along the inside walls of the condenser and down the center of the condenser in countercurrent contact with the gas stream moving up through the secondary condenser. The chilled water so employed is at a temperature just above freezing, e.g. 4°C. This water is cooled by means of a chiller or other suitable cooling means before it enters the secondary condenser.

In the secondary condenser the gas stream is rapidly quenched by the downward flowing, cooled water. Since the water vapor pressure in the secondary condenser is at the saturation point, the contact of the chilled water and the hot gases result in rapid quenching of the phosphorus vapor into a light, fluffy, snowflake-type solid particle which contains water trapped within the particle. This particle, which is termed "snowflake" is formed because the rapid quenching of the phosphorus gas results in the simultaneous condensation of both phosphorus and water together within the secondary condenser. This condensed, snowflake is unlike liquid or solid drops of phosphorus in that they are extremely light and discrete and can be pumped and transported in an aqueous stream.

The snowflake particles formed within the secondary condenser are then carried by the aqueous stream into a storage tank. A dispersion of these snowflake particles can readily be removed from the secondary condenser storage tank, without heating, and passed to the primary condenser settling tank. The phosphorus snowflake melts in the primary settling tank and can be recovered as liquid phosphorus along with the liquid condensate from the primary condenser. Since an aqueous slurry of the snowflake, when maintained dispersed, can be pumped, the snowflake can be transferred continuously from the secondary condenser storage tank.

The gas stream which exits from the secondary condenser at below 25°C is essentially all carbon monoxide and water vapor containing only traces of phosphorus. This stream can then be burned for its carbon monoxide fuel values.

The amount of snowflake which is collected in the secondary condenser is extremely small compared to the phosphorus which is condensed in the primary condenser. As a result only small amounts of aqueous snowflake need be transferred from the secondary condenser holding tank to the primary condenser settling tank. For example, continuous transfer of about 1 percent aqueous slurry of snowflake from the secondary condenser holding tank to the primary condenser settling tank is sufficient to keep the phosphorus system in balance.

The present invention has many advantages over the prior art in recovering phosphorus. For example, the continuous transfer of aqueous snowflake slurry from the secondary condenser holding tank to the primary condenser settling tank permits "phossy water" to be used in the primary condenser for condensing phosphorus rather than fresh water. The term "phossy water" refers to water that has been in previous contact with phosphorus. Thus, the same water condensed in the secondary condenser can be recycled for use in the primary condenser. This eliminates production and disposal of phossy water. Further, one heat exchanger can be utilized to remove the heat load from both the primary and the secondary condenser.

An additional advantage in utilizing the present system is that the primary condenser can be operated at higher temperatures than a single condenser used alone. Higher condenser temperatures obviate problems of phosphorus solidification in the primary condenser and are advantageous. In the absence of an effective, continuous operating secondary condenser system, the primary condenser would have to be operated at lower temperatures in order to diminish the amount of phosphorus lost in the overhead gas stream.

In order to illustrate the present invention, a drawing in the form of a flow sheet of the instant process is attached. In the drawing the furnace gases 2, at a temperature of 400°C, made up essentially of carbon monoxide, phosphorus, water vapor and solid fines enter precipitator 4. The precipitator 4 may be of a cyclone type or any conventional separator which will separate solids from a gas stream. The separated solids are removed from the precipitator 4 through line 8 while the gas stream is removed overhead through line 6. The gas stream from line 6 then enters primary condenser 10 and flows upward through the condenser. Countercurrent to the gas stream water from inlet line 12 is sprayed into the condenser and falls downwardly. The temperature of the water in line 12 is regulated to permit the exit gas stream 24 to be maintained above 44°C, and preferably about 60°C. The water spray condenses the gaseous phosphorus primarily by evaporation of water and the liquified phosphorus and water flow through line 14 into the primary condenser settler (and holding tank) 16. In this settler 16 the molten phosphorus sinks to the bottom and forms layer 18 while the water forms a supernatant layer 20. The liquid phosphorus is removed as product through line 22 as required. The condensing water used in the primary condenser is supplied from the water layer 20 in the primary condenser settler 16 and is passed upward into the primary condenser 10 through line 12.

The gas stream 24 that exits from the primary condenser 10 enters secondary condenser 26 at a temperature above 44°C, and preferably at a temperature of about 60°C. This gas stream is quenched by means of chilled water supplied through distribution pipes 28 which are connected to dispersing heads (not shown) within the secondary condenser. The chilled water is dispersed along the interior walls of the secondary condenser 26 and also dispersed intimately throughout the center section of the condenser to obtain good contact with the upflowing gas stream. The water entering through distribution pipes 28 is at a temperature slightly above freezing, e.g. 4°C, and is of sufficient quantity to rapidly quench the gas stream which flows upward through the secondary condenser 26 to form particles of phosphorus "snowflakes." These phosphorus particles are light, fluffy, snowflake-like solids which contain entrapped water within the snowflake. The snowflake is formed by the rapid quenching of the phosphorus so that both water vapor and phosphorus are condensed simultaneously and in intimate contact with one another.

The water and solid snowflake slurry then flow downwardly through line 30 into the secondary condenser holding tank 32. The snowflake and water are maintained in the form of a dispersion 36 in the secondary condenser holding tank 32. A mixture of water and snowflake is removed from the tank 32 and transferred continuously to the settler 16 for recovery of phosphorus. Water is separated from the snowflake slurry and passed through line 40 into a phossy water (water that has contacted phosphorus) tank 42. The phossy water 44 in tank 42 is then pumped through line 46 into heat exchanger 48 and chilled to just above freezing. The chilled water is then removed through line 50 and passed through distribution pipes 28 into the secondary condenser 26. Excess water is removed from phossy water tank 42 through line 52 and enters settler 54. After settling, any excess waste water is removed through line 56.

The following example is given to illustrate the invention but is not deemed to be limiting thereof.

A gas stream from a phosphorus electric furnace, having a temperature of 400°C and containing 8% $P_4$, 1% $H_2O$ and 91% CO (percent by volume basis), was passed into a condensing system such as that illustrated in the drawing. In the first stage the furnace gas was treated to remove fine dust in a solids-gas separator. Thereafter the dust-free gases were passed into a primary condenser 10 and cooled by spraying water from line 12 countercurrent to the gas stream. The water used for cooling was at a temperature of 60°C. The primary condenser condensed about 98.8 percent of the phosphorus in the entering gas stream.

The condensed phosphorus and water, at a temperature of about 60°C, were passed into a heated settler 16 where the phosphorus settled to the base of the settler while a water layer remained above the liquid phosphorus. Phosphorus was recovered as product from the settler 16 in molten form. The source of the water for cooling the primary condenser was the water layer in the settler and this was removed through line 12 and introduced into the primary condenser. The overhead gas stream 24 from the primary condenser was at a temperature of 60°C and contained 0.001017 pound moles of phosphorus and 0.2298 pound moles of water per pound mole of carbon monoxide; it was passed into secondary condenser 26 for further condensation of its phosphorus values. Chilled water at 4°C was introduced into the secondary condenser 26 countercurrent to the entering gas stream and 96.9 percent of the phosphorus entering the secondary condenser was converted to a light, fluffy, snowflake-type solid containing entrapped water. A slurry of the phosphorus snowflake and water at a temperature of 19°C was passed from the condenser to a holding tank 32. The total combined efficiency for the first and secondary condensers was 99.96 percent phosphorus removal from the original furnace gas stream. The overhead gas stream 58, at a temperature of 8°C, contained 0.0000313 pound moles of phosphorus and 0.01122 pound moles of water per pound mole of carbon monoxide. This gas stream was sent to a furnace to recover the fuel values of the carbon monoxide. The snowflake slurry in holding tank 32 was transferred continuously to settler 16 as an aqueous snowflake slurry of about 1 percent by means of conduit 38. Water was separated from the snowflake slurry in holding tank 32 by baffle means and passed through line 40 into a phossy water tank 42. From the phossy water tank 42 phossy water was pumped through line 46 at a temperature of 19°C to a heat exchanger for cooling of the water prior to its being introduced into the secondary condenser 26 through line 50 and distribution pipes 28. Any small amount of excess water was removed from the phossy water tank 42 and transferred to a settler where the water was removed to waste.

In the above operation the cooling water 12 used in the primary condenser 10 condensed the phosphorus essentially by evaporation. The evaporated water was, in turn, condensed in the secondary condenser 26, passed to holding tank 32, returned in part to the primary settler 16 and to phossy water tank 42, and finally to primary condenser 10 and secondary condenser 26. Thus, phossy water was used as the cooling water in an essentially closed cycle through both the primary and secondary condensers.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the process of recovering phosphorus from a solids-free gas stream consisting essentially of carbon monoxide, elemental vaporous phosphorus and water from an electric reduction furnace wherein the phosphorus is condensed in an initial condensing zone and a secondary condensing zone, the improvement which comprises contacting the gas stream in an initial condensing zone with water at a temperature sufficient to condense a portion of the gaseous phosphorus in said gas stream to liquid phosphorus, passing said liquid phosphorus to a settling zone, passing the exit gas stream from the initial condensing zone containing residual uncondensed phosphorus into a secondary condensing zone, contacting the gas stream in said secondary condensing zone with water at a temperature sufficient to form particles of solidified phosphorus containing water therein, passing an aqueous slurry of said particles to said settling zone and recovering liquid phosphorus from said settling zone.

2. Process of claim 1 wherein an aqueous slurry of said solid phosphorus containing water therein is passed to a holding zone and thereafter the slurry is passed from said holding zone to said settling zone for recovery of said solidified phosphorus in molten phosphorus form.

3. Process of claim 1 wherein the water used for condensing liquid phosphorus in the primary condenser is recycle water used in forming said particles of solidified phosphorus containing water therein, in said secondary condenser.

4. Process of claim 1 wherein the cooling water in the primary condensing zone has a temperature of about 60°C and the cooling water in the secondary condensing zone has a temperature of about 4°C.

* * * * *